United States Patent
Wickström et al.

(10) Patent No.: US 10,627,023 B2
(45) Date of Patent: Apr. 21, 2020

(54) THREADED COUPLING END FOR A PERCUSSION DRILL STRING COMPONENT

(71) Applicant: SANDVIK INTELLECTUAL PROPERTY AB, Sandviken (SE)

(72) Inventors: David Wickström, Sandviken (SE); Andreas Norman, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 227 days.

(21) Appl. No.: 15/576,123

(22) PCT Filed: May 19, 2016

(86) PCT No.: PCT/EP2016/061292
§ 371 (c)(1),
(2) Date: Nov. 21, 2017

(87) PCT Pub. No.: WO2016/188857
PCT Pub. Date: Dec. 1, 2016

(65) Prior Publication Data
US 2018/0135783 A1    May 17, 2018

(30) Foreign Application Priority Data
May 22, 2015 (EP) .................................... 15168925

(51) Int. Cl.
*F16L 15/06*    (2006.01)
*E21B 17/042*    (2006.01)
*E21B 1/00*    (2006.01)

(52) U.S. Cl.
CPC .......... *F16L 15/06* (2013.01); *E21B 17/0426* (2013.01); *E21B 1/00* (2013.01)

(58) Field of Classification Search
CPC .......... F16L 15/06; E21B 17/0426; E21B 1/00
See application file for complete search history.

(56) References Cited

U.S. PATENT DOCUMENTS

| 5,169,256 A | 12/1992 | Woodings et al. |
| 6,293,360 B1 | 9/2001 | Liljebrand et al. |
| 6,767,156 B1 * | 7/2004 | Larsson ............... E21B 17/0426 403/343 |
| 2001/0029807 A1 * | 10/2001 | Linden ................ E21B 17/0426 75/228 |

(Continued)

FOREIGN PATENT DOCUMENTS

| EP | 0391119 | 10/1990 |
| EP | 2845991 B1 | 3/2015 |

(Continued)

OTHER PUBLICATIONS

International Preliminary Report on Patentability for PCT/EP2016/061292, dated Nov. 28, 2017.*

*Primary Examiner* — Anna M Momper
*Assistant Examiner* — James A Linford
(74) *Attorney, Agent, or Firm* — Corinne R. Gorski (57) ABSTRACT

A threaded coupling for a drill string component includes a body on which is formed a thread. A reduction in stress concentrations and a resistance to bending moments are achieved at the thread by reducing a thread depth at at least one axial end of the thread and by arranging an endmost flank of a crest or root of the thread at an endmost helical turn.

15 Claims, 9 Drawing Sheets

(56) References Cited

U.S. PATENT DOCUMENTS

2006/0060388 A1* 3/2006 Linden .................... E21B 10/36
                                                              175/414
2016/0215572 A1* 7/2016 Jansson ................ E21B 17/042
2017/0321496 A1* 11/2017 Mattson .................... E21B 1/00

FOREIGN PATENT DOCUMENTS

| EP | 2845992 | 3/2015 |
| EP | 3023575 A1 | 5/2016 |
| JP | 55-119886 | 9/1980 |
| JP | S62125192 A | 6/1987 |
| RU | 2302506 C2 | 7/2007 |
| WO | 09949176 A1 | 9/1990 |
| WO | 2006092649 A1 | 9/2006 |
| WO | 2007133145 A1 | 11/2007 |
| WO | 2008/150207 | 12/2008 |

* cited by examiner

THREADED COUPLING END FOR A PERCUSSION DRILL STRING COMPONENT

RELATED APPLICATION DATA

This application is a § 371 National Stage Application of PCT International Application No. PCT/EP2016/061292 filed May 19, 2016 claiming priority to EP Application No. 15168925.4 filed May 22, 2015.

FIELD OF INVENTION

The present invention relates to a threaded coupling for a drill string component and in particular, although not exclusively, to one half of a threaded joint in which a depth of the thread at a first and/or second end decreases to strengthen the coupling against bending forces and to reduce stress concentrations.

BACKGROUND ART

Drilling, used to create long boreholes, typically involves a plurality of elongate drill string rods coupled together end-to-end by interconnected male and female threaded ends. As will be appreciated, the threads of both the male and female ends are subject to stress concentrations which results in material fatigue and a reduction in the service life of the drill string component. In general, the stress concentrations tended to be highest at one or both of the axial ends of the thread particularly as a result of bending moments imparted to the coupling due to large lateral shifts of the drill string during boring and potentially during retrieval preparations. Attempts to improve the threaded joints are described in WO 2007/133145 and WO 2008/150207.

EP 1066448 describes a threaded coupling for percussive drilling in which a cylindrical external thread has at least one thread end in which the thread depth decreases in an attempt to reduce the likelihood of damage to the thread. However, existing threaded joints are still susceptible to stress concentrations and fatigue during use and there exists a need for a threaded coupling that offers enhanced strength and durability over existing configurations.

SUMMARY OF THE INVENTION

It is an objective of the present invention to provide a drill string component having a threaded coupling end to form part of a drill string in which the coupling end is configured to withstand non-symmetrical loading forces acting on the drill string, to reduce stress and fatigue at the threaded section and to minimise the risk of failure of the coupling. It is a further objective to provide a male and/or female part of the coupling configured for shoulder or bottom contact in which the threads are specifically configured to minimise stress concentrations at the axial ends of the thread.

The objectives are achieved by providing a male and/or female coupling end of a drill string component suitable for shoulder or bottom contact in which at least one axial end of the thread is adapted with a profile that is different from a main length of the thread axially intermediate the thread ends. In particular, the present coupling comprises a thread depth that is tapered to decrease in a circumferential path of the thread towards the thread end. Accordingly, the ends of the thread are devoid of any sharp or sudden changes in the thread depth. Such a configuration has been found to minimise stress concentrations at the thread ends whilst still providing a thread of a female and a male end that may be coupled and disconnected conveniently and reliably. The resistance to bending forces is achieved by minimising the axial length of an endmost helical turn of the thread and specifically by configuring the shape profile of the axially endmost flank that at least partially defines the crest or root of the thread within the final helical turn. That is, according to the subject invention, an axial length of the endmost flank of the crest or root of the endmost helical turn decreases at a rate that is greater than any change in the axial length of the neighbouring flank at the alternate side of the same crest or root within an axial end transition region of the thread where the thread depth decreases.

According to one aspect of the present invention there is provided a threaded coupling of a drill string component for drilling comprising: a body having a portion with a longitudinal axis around which extends a thread to form one half of a threaded joint; the thread formed by at least one ridge extending circumferentially and axially along the body as helical turns having crests and roots separated axially by respective flanks, the thread having axially spaced apart first and second thread ends; wherein a depth of the thread at the first and/or second end in the radial direction is tapered to decrease along the circumferential path of the thread in an axial direction towards the end of the thread; characterised in that: an axial length of an axially endmost flank of the crest or root of an axially endmost helical turn decreases at a rate greater than the neighbouring flank at the alternate axial side of said crest or root of the axially endmost helical turn.

Accordingly, a circumferential path of the endmost flank is angled or curved in the circumferential path of the thread towards the crest or root of the axially endmost helical turn relative to the circumferential path of the neighbouring flank such that an axial length of the endmost flank is less than the axial length of the neighbouring flank within an end transition region of the thread within which the depth of the thread decreases. The transition region at the axial end(s) of the thread accordingly comprises a 'transition start' corresponding to the position (within the circumferential path of the endmost helical turn) where the depth of the thread is equal to the depth at the axially inner region of the thread and a 'transition end' corresponding to the position where the thread depth is equal or approximately equal to zero. That is, the transition region, having a decreasing thread depth extends circumferentially over a portion of the endmost helical turn. Such a configuration is advantageous to minimise stress concentrations at the thread end(s) and to minimise the axial distance over which the transitional region extends. This has the effect of increasing the axial distance of a non-threaded region of the body axially adjacent the threaded section. The present invention has been found to be advantageous for shoulder contact configurations so as to maximise the axial separation distance between the end/start of the thread and the radial shoulder that provides the shoulder contact. Axially separating the shoulder and the thread acts to minimise the stress and resistance to bending moments.

Reference within the specification to 'flank' encompasses the region in the axial direction between a neighbouring crest and a root being a component part of the axially extending helical ridge. Accordingly, the flank at each axial side of a crest and root may be the same and comprise the same axial length where the thread is uniform. Additionally, the surface at the flanks may define sections of a cone so as to be generally linear in a cross sectional plane extending axially through the coupling.

Optionally, the depth of the thread of the axially endmost helical turn decreases to zero in the range 0.1 to 0.8 (approximately 30 to 290 degrees and in particular 36 to 288 degrees) or more preferably 0.2 to 0.6 (approximately 70 to 220 degrees and in particular 72 to 216 degrees) of a full helical turn.

Optionally, the portion of the body on which the thread is formed is generally cylindrical. According to further optional configurations, the portion on which the thread is formed may be conical. The present thread is according compatible with existing thread configurations.

Preferably, an axial length of the neighbouring flank is approximately equal to the axial length of any one of the flanks of helical turns positioned axially between the endmost helical turns. Such a configuration is advantageous to maintain the pitch of the thread at the thread ends to avoid problems with coupling and decoupling the threaded joint.

Optionally, the thread is formed externally at the portion of the body to represent a male coupling end. Alternatively, the thread may be formed internally at the portion of the body to represent a female coupling end. Optionally, the subject invention may be applied to both ends of the thread or to a single end only being an axially inner end (positioned axially adjacent a shoulder or main length of the drill string component) or an outer end (positioned axially adjacent one end of the drill string component being either a male or female coupling end).

Where the subject invention is provided at a male coupling, the body may comprise a non-threaded shank into which the depth of the thread decreases along the circumferential path of the thread. Optionally, the body may comprise an annular side surface projecting radially from one axial end of the non-threaded shank, the side surface being aligned transverse or generally perpendicular to the longitudinal axis. Such a configuration provides the shoulder contact configuration of the threaded coupling. Preferably, the subject invention is provided at the end of the thread axially closest to the annular side surface so as to maximise the axial separation distance between the start of the thread and the annular side surface.

Preferably, the respective flanks of the crests comprise a generally equal axial length over the axial length of the thread excluding the axially endmost helical turns. The axially endmost flank of the crest or root of the axially endmost helical turn is accordingly less than the axial length of the respective flanks of the thread of the axially inner crests (extending between the endmost helical turns). Accordingly, the thread is substantially uniform over its full axial length excluding the end transition region(s). Accordingly, the subject invention is compatible with existing male or female ends of conventional drill string components and comprises a thread profile and configuration being consistent with existing standards for both helical and conical threaded sections forming part of a drill string component.

As the axial length of the endmost flank decreases at a rate greater than neighbouring flank, a circumferential path of the endmost flank may be considered to be aligned transverse to a circumferential path of the neighbouring flank with the effect that the axially endmost part of the thread appears to bend axially inward towards the axially inner region of the thread. Such a configuration avoids the end transition region (s) of the thread projecting axially outward from the main body of the thread so as to provide a threaded section that is axially compact.

Optionally, a diameter of the thread at a radial position of the crests is equal to or greater than a diameter of the body axially to one side of the thread. Alternatively, a diameter of the thread at a radial position of the crests is equal to or less than a diameter of the body axially to one side of the thread. Accordingly, the thread may be considered to stand proud of the main body or to be recessed into the body.

Within this specification reference to Dy corresponds to the diametric distance between the radial positions at the crests (of the helical ridge) on diametrically opposite sides of the threaded section to represent a maximum diameter of the threaded section. Where the threaded section is generally conical, Dy corresponds to the diametric distance of the axially endmost crest having the largest radius/diameter. Within this specification reference to Ds corresponds to a minimum (smallest) diameter of the non-threaded shank and Dm corresponds to a diameter of the main length section. Additionally, within this specification, reference to Di corresponds to the diametric distance between the radial positions at the roots (of the helical ridge) on diametrically opposite sides of the threaded section to represent a minimum diameter of the threaded section. Where the threaded section is generally conical, Di corresponds to the diametric distance of the axially endmost root having the largest radius/diameter.

Within this specification, reference to Ls corresponds to an axial length of the non-threaded shank defined between an axially inner end of the threaded section and the side surface of the shoulder or main length section and Lt corresponds to an axial length of the threaded section between the thread exit ends.

Preferably, Ls is less than an axial length Lt of the threaded section. Optionally, the diameter (Ds) of the non-threaded shank is approximately equal to or less than a diameter of (Dm) of the main length section. Optionally, Ds may be approximately equal to Dy.

Preferably, Ds is less than Dy. Preferably, Ds is less than a diametric distance (Di) between the radial positions of the roots (between the helical ridges) on diametrically opposed sides of the threaded section. More preferably, Ds may be in the range (Di minus Td) to (Di minus 4Td), where Td is the thread depth perpendicular to the longitudinal axis between the radial positions of a crest and a root. More preferably, Ds is in the range (Di minus Td) to (Di minus 3Td). Most preferably, Ds is equal to Di minus 2Td. The spigot, comprising a Ds configuration as detailed herein, is advantageous to allow optimisation of the transition region adjacent to the annular side surface of the shoulder or end of the main length section. In particular, a Ds that is less than Di enables an axially longer transition region and a greater radii of curvature at the transition between the non-threaded shank and the annular side surface (of the shoulder or main length section). Accordingly, the present configuration of Ds minimises stress concentrations at the base of the spigot (at its junction with the main length or shoulder section). The present configuration of Ds in combination with Ls is accordingly advantageous to provide a percussion component that is resistant to bending stresses and also configured to withstand the stresses resultant from transmission of the percussive shock wave through the spigot both when the components of the drill string are perfectly aligned axially and also when deflected (being aligned slightly transverse to one another) in use.

Preferably, the curvature of the transition region axially closest to the side surface comprises at least three or four radii of curvature. Optionally, the curvature of the transition region comprises three to six or three to four radii of curvature. Preferably, the radii at the transition region increase in an axial direction from the side surface (of the shoulder or main length) towards a minimum diameter (Ds) of the non-threaded shank.

Preferably, the transition region comprises three or four different radii of curvature. Optionally, a first radius of curvature R1 is approximately half a second radius of curvature R1~R2/2; optionally R2 is approximately half a third radius of curvature R2~R3/2; optionally, R3 is approximately a third of a fourth radius of curvature R3~R4/3 respectively at the transition region where R1 is positioned closest to the side surface and R4 is located at and defines the minimum diameter Ds of the non-threaded shank.

The subject invention is configured specifically as a threaded spigot for a percussion drill component. The elongate component and in particular the male spigot via a configuration of the threads and the non-threaded shank (as detailed herein) is adapted to withstand bending forces and stress concentrations resultant from transmission of the percussive shock whilst minimising any reduction in the magnitude of the shock wave during transmission. The thread profile of the spigot is adapted for percussion drilling and preferably the threads comprise a uniform diameter along the axial length of the threaded section Lt. That is, the threaded section is formed preferably as a generally cylindrical section. As such the thread profile is appreciably robust to withstand the shock wave transmission and hence high loading forces. In particular, the subject invention comprises a thread having a pitch length in the range 5 to 50 mm for drill components with increasing respective outside diameters. Additionally, a pitch angle of the thread of the subject invention may be in a range 5 to 10° for a component with a respective pitch length and outside diameter, where the pitch angle is the angle θ extending between the path of the helical thread path and the tangent perpendicular to the longitudinal axis of the elongate component. Additionally, the diameter Dy of the threaded section (the thread crest-to-crest distance) according to aspects of the present invention may be in a range 15 to 120 mm for respective pitch lengths and pitch angles. Accordingly, the subject invention may comprise a thread configuration in which the quotient of pitch length/thread diameter is in a range 0.3 to 0.6; 0.35 to 0.55 and optionally 0.4 to 0.46.

According to a second aspect of the present invention there is provided a drill string component comprising the threaded coupling as claimed herein wherein the component comprises any one of the following: a drill rod; a drill tube; a shank adaptor; a drill bit.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

The subject invention will be described by way of example with reference to a shank adaptor being a drill string component to form part of a drill string. It will be appreciated that the subject invention is applicable to any elongate component of a drill string adapted for either shoulder or bottom contact configurations of coupling joint in which a male and female threaded component are mated together axially. Accordingly, the subject invention may be applied to a drill rod, drill tubing, a shank, a shank adaptor, a drill bit, a shaft or adaptor mounted at the driving end of the drill string or at the bit end of the drill string.

Figure 1:
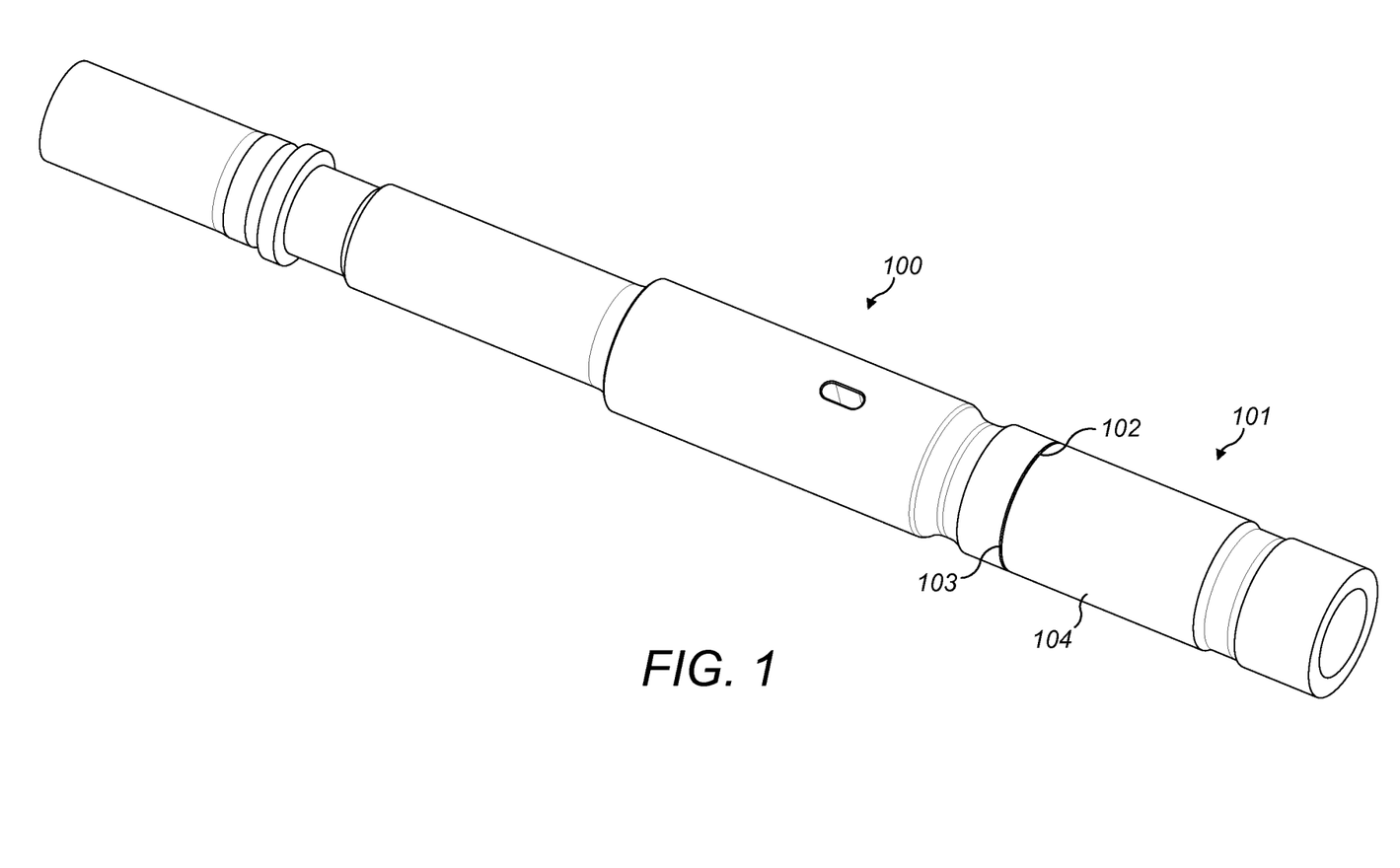
FIG. 1 is an external perspective view of a part of a drill string comprising a shank adaptor coupled axially via one end to a drill rod via a male and female coupling joint.

Referring to FIG. 1, a drill string comprises an elongate shank adaptor 100 coupled axially to an endmost drill rod 101 via a threaded coupling 104 formed by a male threaded end of the shank adaptor 100 and a female threaded end of the drill rod 101. Both drill string components 100, 101 are coupled via 'shoulder contact' in which an annular side surface 102 of the male coupling of adaptor 100 is engaged in touching contact with a corresponding annular side surface 103 of the female sleeve of the drill rod 101.

Figure 2:
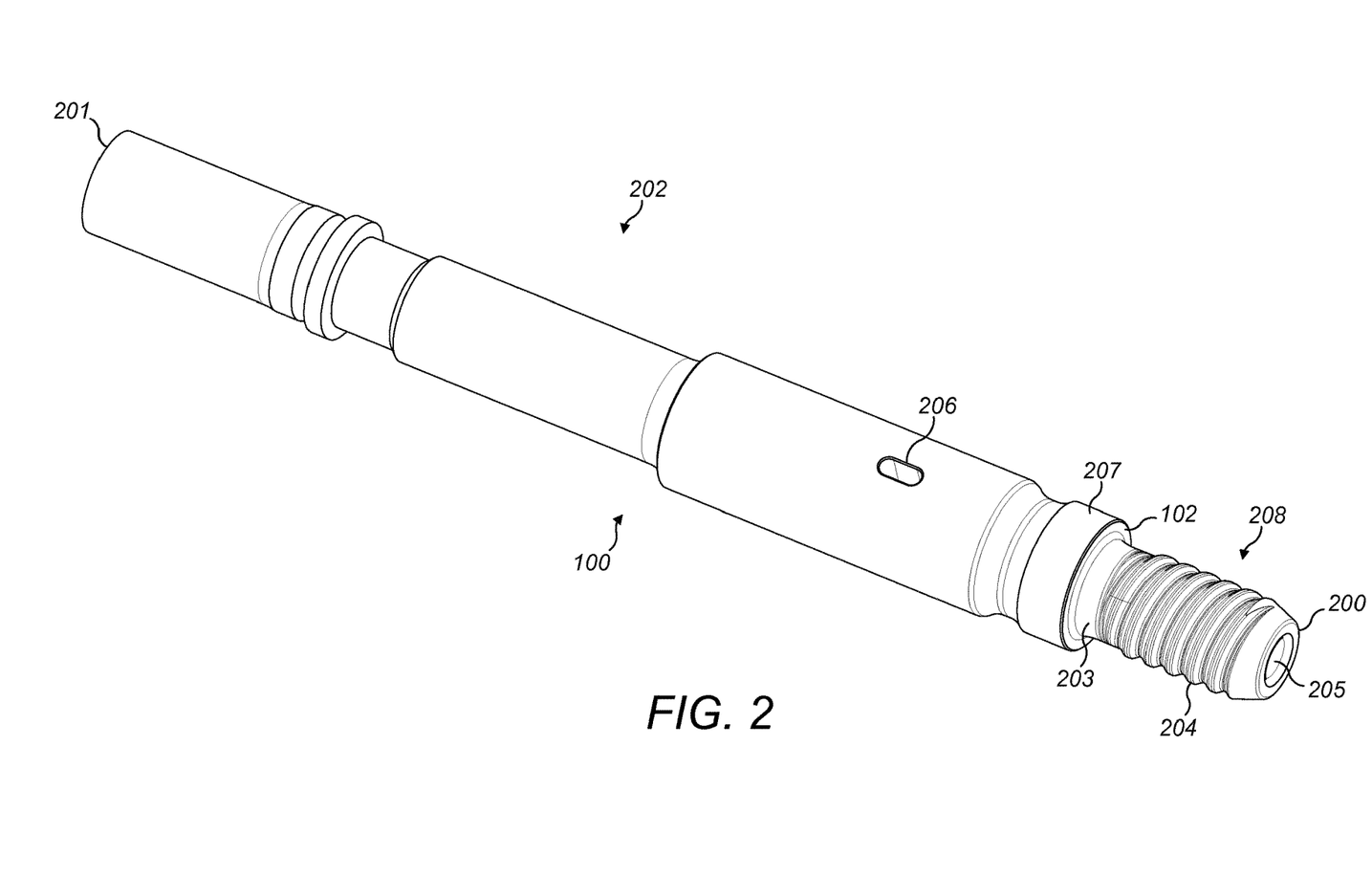
FIG. 2 is a perspective view of the shank adaptor of FIG. 1 according to a specific implementation of the present invention.

Referring to FIG. 2, the shank adaptor 100 comprises a main length section 202 having a first end 200 and a second end 201 and is configured for mounting, via second end 201, at a driving end of the drill string adjacent the percussive hammer. A flushing hole 206 is formed within main length section 202 to allow the introduction of a flushing fluid into a central bore 205 extending axially through the axially forward length part of adaptor 100 between flushing hole 206 and first end 200. Main length section 202 is terminated towards first end 200 by an annular shoulder 207 that projects radially from a male spigot 208 comprising an external diameter being less than a corresponding external diameter of shoulder 207 and main length section 202. Accordingly, the annular side surface 102 is provided at the axial junction between spigot 208 and shoulder 207 to provide the shoulder contact surface for abutment against an annular side surface 103 of the threaded female coupling. Spigot 208 is divided axially into a threaded section 204 extending axially towards first end 200 and a non-threaded shank 203 positioned axially intermediate threaded section 204 and shoulder 207.

Figure 3:
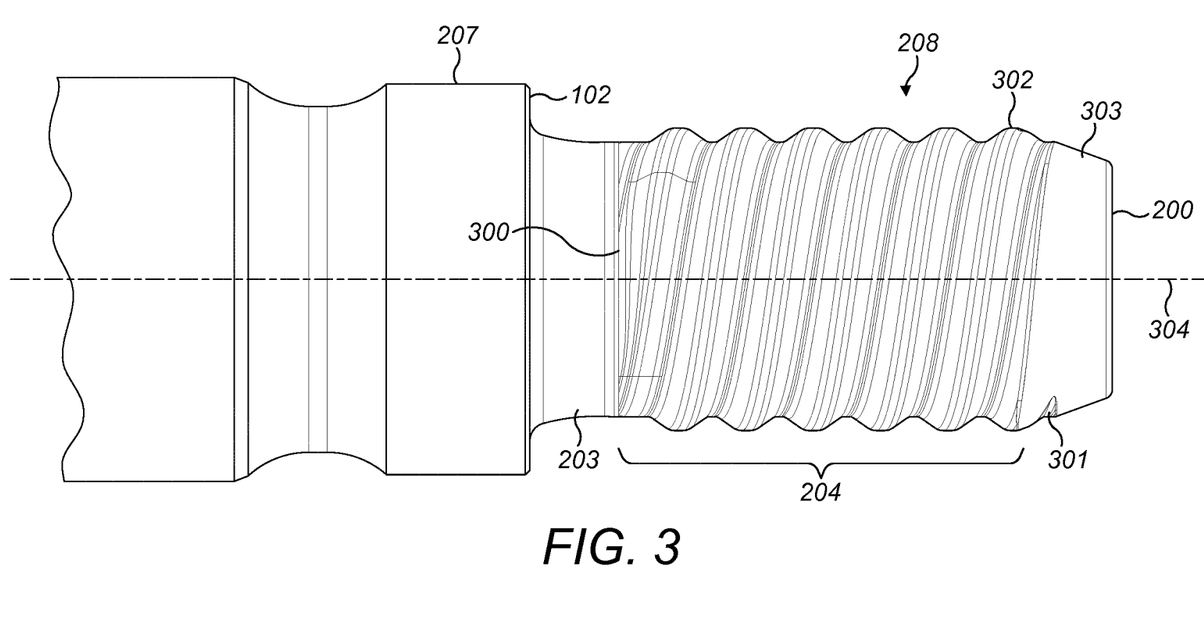
FIG. 3 is a perspective view of the male end of the shank adaptor of FIG. 2.
Figure 4:
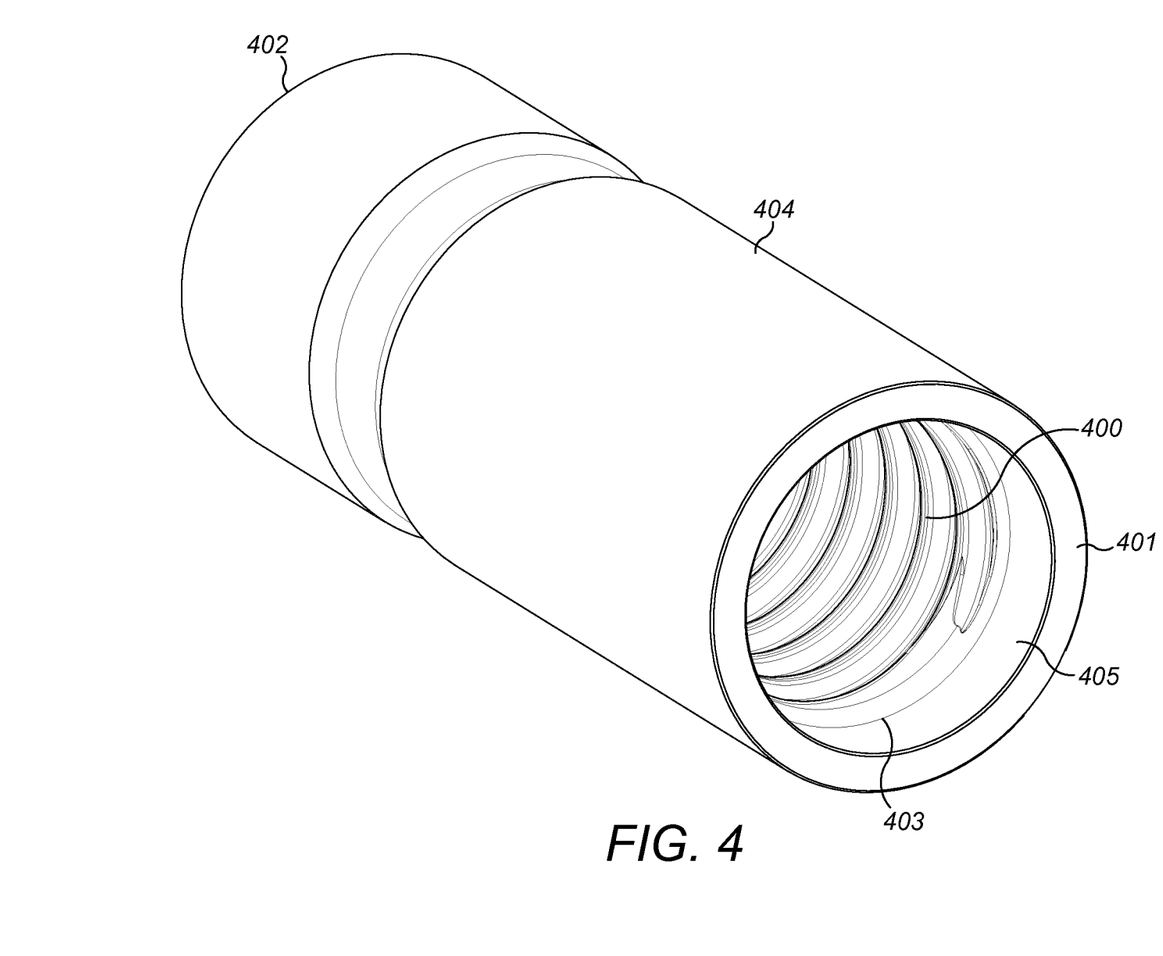
FIG. 4 is a perspective view of the female coupling end of the drill rod of FIG. 1.

Referring to FIG. 3, threaded section 204 extends axially between non-threaded shank 203 and an endmost conical section 303 positioned at adaptor first end 200. Threaded section 204 comprises a first thread end 301 that terminates at conical section 303 and a second thread end 300 that terminates at non-threaded shank 203. The threaded section 204 is formed by a single start helical thread in which a single ridge 302 follows a helical path extending circumferentially around spigot 208 between conical section 303 and non-threaded shank 203. Referring to FIG. 4, threaded male spigot 208 is configured to be received within a female sleeve 404 comprising a corresponding threaded section 400 provided at an internal facing surface 405 of the sleeve 404. Threaded section 400 extends axially between a first axial end 401 and second axial end 402 of the hollow cylinder and comprises a first thread end 403 and a second thread end (not shown) positioned axially towards sleeve second end 402. The present invention is described with reference to the male spigot 208 but as will be appreciated may be applied also to the thread 400 formed internally within sleeve 404.

Figure 5:
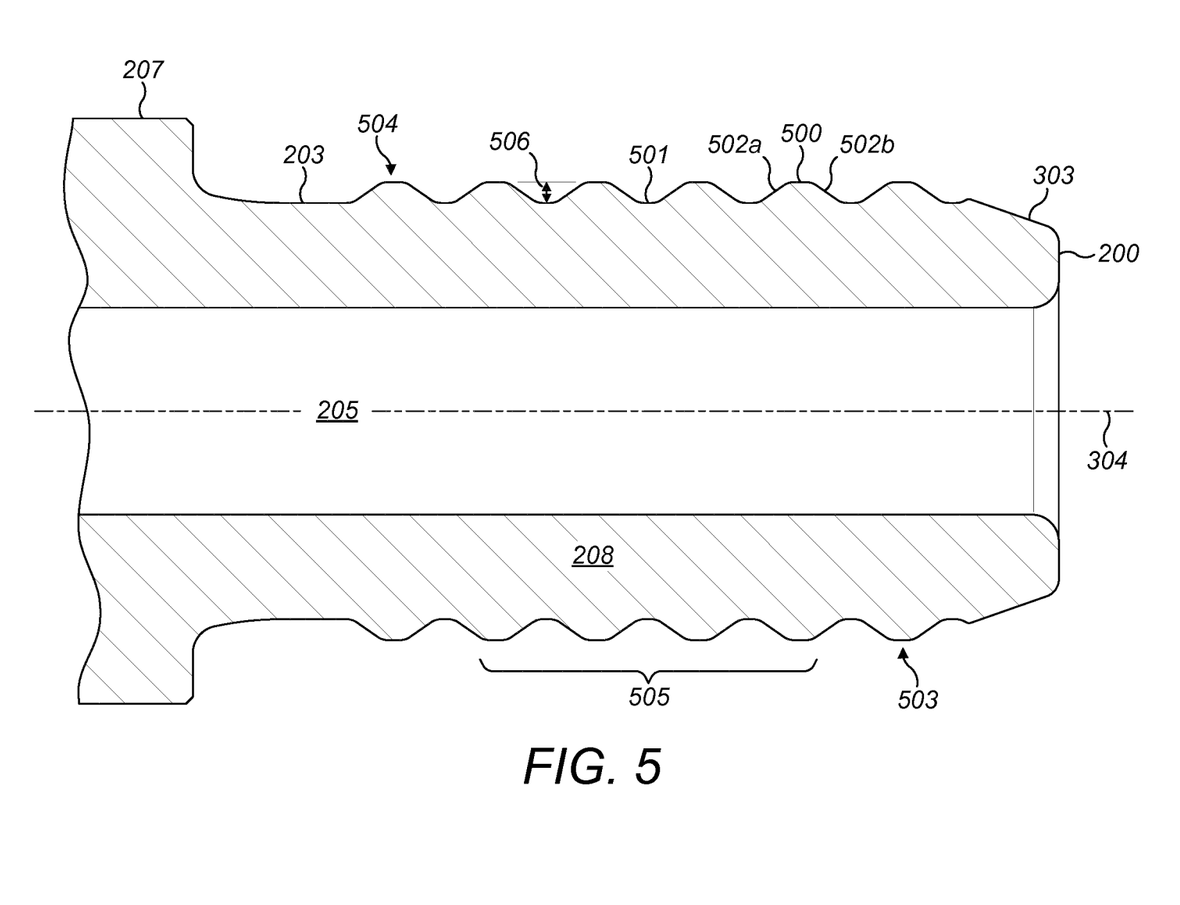
FIG. 5 is an elongate cross sectional view through the male threaded end of FIG. 3.
Figure 6:
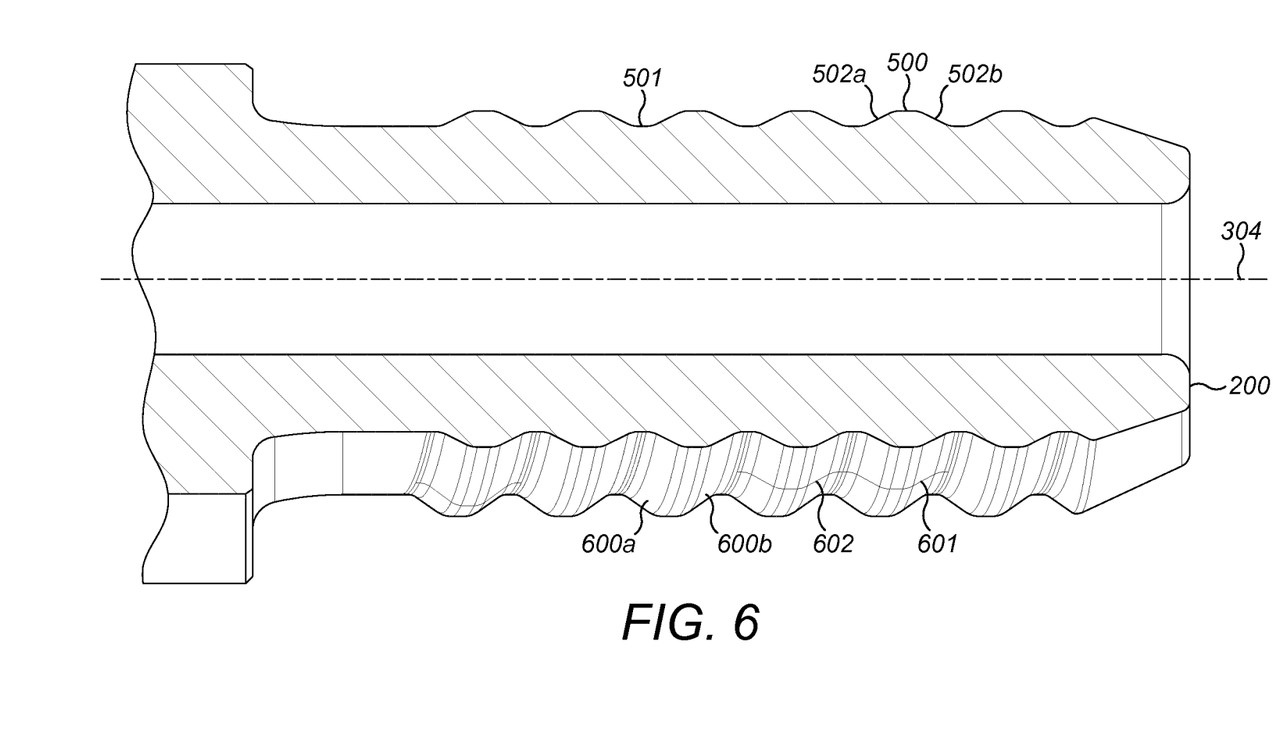
FIG. 6 is a cross sectional perspective view through the male threaded end of FIG. 3.

Referring to FIGS. 3 to 6, thread ridge 302 of spigot 208 may be considered to comprise a plurality of helical turns each turn extending 360° externally over spigot 208 around a central axis 304 of the adaptor 100. Accordingly, each turn may be considered to comprise an axial and circumferential start 601 and a corresponding axial and circumferential end 602 as illustrated in FIG. 6. Each of the helical turns comprise a crest 500 and a corresponding root 501 with the crest and roots 500, 501 separated by respective flanks 502*a*, 502*b*. Each flank 502*a*, 502*b* extends axially between a crest 500 and an adjacent root 501 being aligned generally transverse to axis 304. Accordingly, each flank 502*a*, 502*b* is formed as an inclined and declined curved surface 600*a*, 600*b* that provides a smooth transition between each of the crests 500 and the axially neighbouring roots 501.

Figure 7:
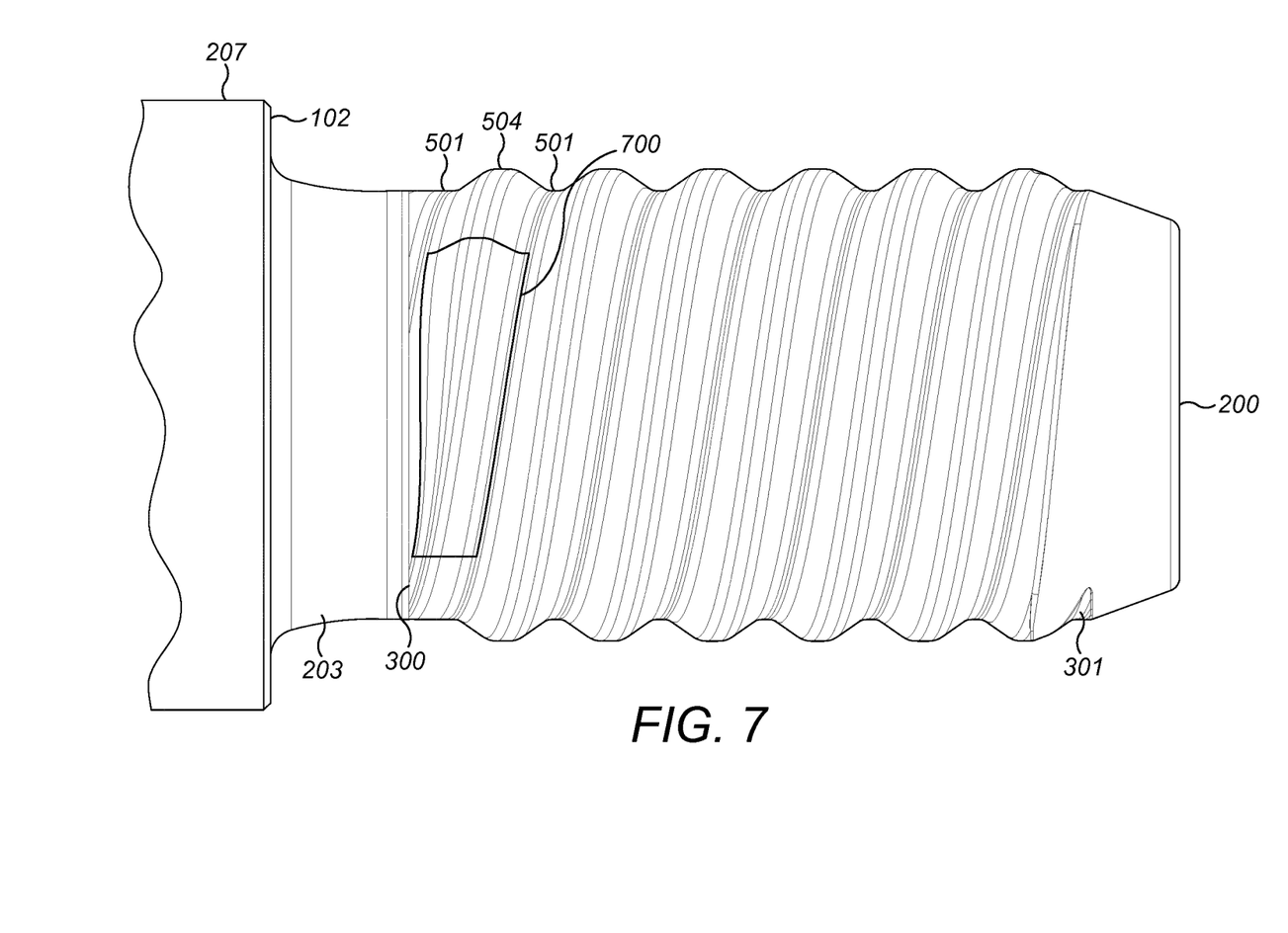
FIG. 7 is a further external perspective view of the threaded male end of FIG. 3.

Referring to FIG. 5, threaded section 204 comprises a plurality of axially inner helical turns 505, a first axially endmost turn 503 (that terminates at conical section 303) and a second endmost turn 504 (that terminates at non-threaded shank 203). According to the specific implementation, the shape, dimensions and/or configurations of the endmost helical turns 503, 504 are different to the axial inner helical turns 505 and are configured specifically to reduce stress concentrations at the threaded section 204 resultant from bending forces. In particular a depth 506 of the thread, corresponding to the radial distance between root 501 and crest 500, diminishes at each endmost helical turn 503, 504 relative to the depth 506 at the innermost helical turns 505. Referring to FIG. 7, the axially inner endmost helical turn 504 comprises a transition region indicated generally by reference 700 within which the thread depth 506 of the ridge 302 decreases from the level of the axially inner helical turns 505 to zero. Transition region 700, according to the specific implementation, extends circumferentially over a distance in a range 0.2 to 0.3 (90 degrees) of a full helical turn as defined between the turn start and end 601, 602. Transition region 700 is defined circumferentially by a transition start 802 and a transition end 803. Region 700 is defined axially so as to encompass the axially endmost flank 502*c* positioned axially closest to non-threaded shank 203 and an axially innermost flank 502*d* positioned axially closest to the axially inner helical turns 505. Accordingly, transition region 700 extends axially between axial neighbouring roots 501.

Figure 8:
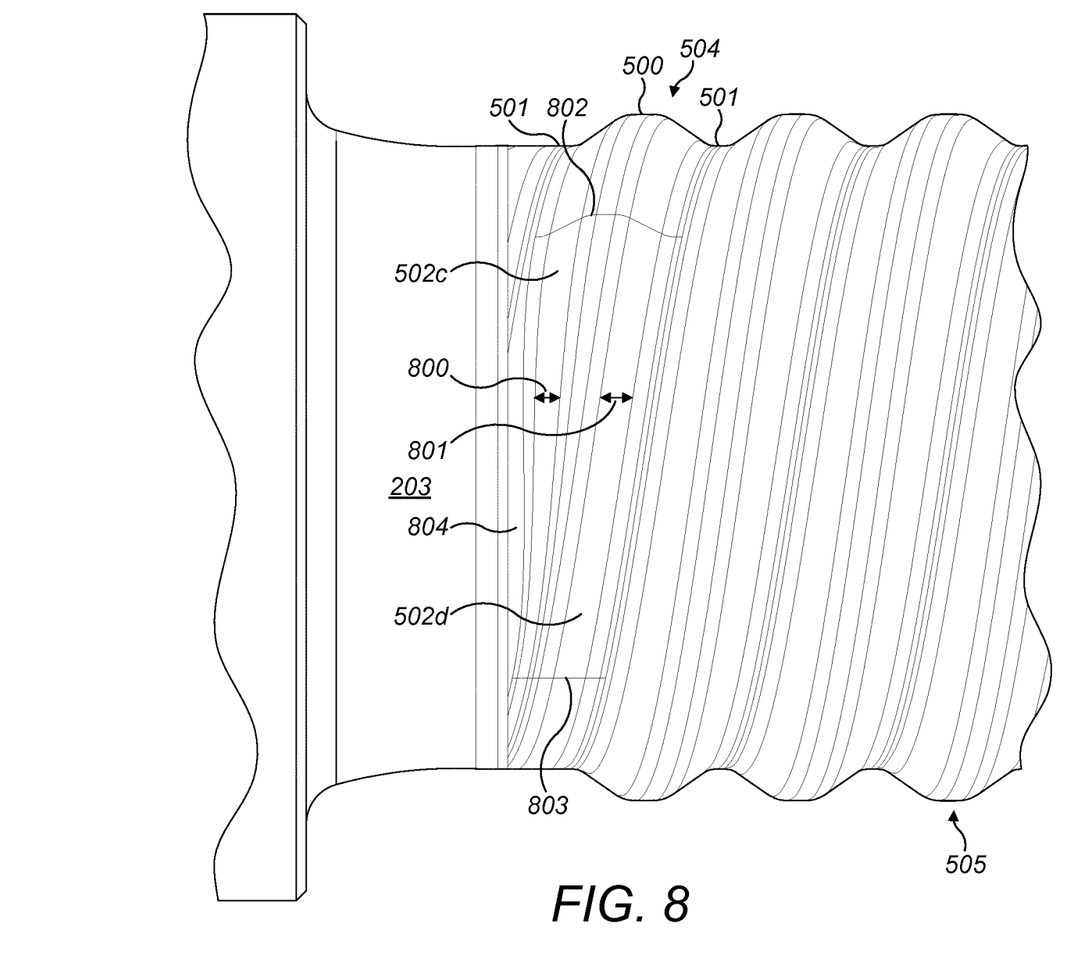
FIG. 8 is a magnified external perspective view of an axial innermost end of the male threaded section of FIG. 7.

Referring to FIG. 8, thread depth 506 decreases from transition start 802 to transition end 803 whilst the pitch of the thread (as defined between axially neighbouring crests 500) is maintained constant over the full axial length of threaded section 204. The thread depth at transition start 802 is approximately equal to the thread depth 506 at the axially inner helical turns 505 and a thread depth 506 at transition end 803 is zero (or substantially zero). The axially endmost helical turn 504 within the transition region 700 comprises a crest 500 bordered at each axial side by two asymmetric flanks 502*c*, 502*d*. In particular, inner flank 502*d* comprises an axial length 801 that is generally greater than a corresponding axial length 800 of the endmost flank 502*c*, with this relative difference extending over the full circumferential length of the transition region 700 between start 802 and end 803. In particular, the circumferential path of the endmost flank 502*c* is angled or curved in the circumferential path of the thread towards crest 500 such that the axial length 800 of the endmost flank 502*c* decreases at a rate that is greater than that of the inner flank 502*d* as the thread depth decreases from transition start 802 to transition end 803. Accordingly, a region 804 is created to the innermost axial side of inner flank 502*c* that comprises an external diameter being approximately equal to the external diameter of non-threaded shank 203. As such, it may be considered that the non-threaded shank 203 is extended axially into the threaded section 204 as the thread, at end 300, is truncated by the change in the shape profile and the orientation of the endmost flank 502*c*. According to the specific implementation, an axial length of flank 502*c* at a mid-circumferential point of transition region 700 (midpoint between start 802 and end 803) is approximately 0.4 to 0.7 of the corresponding axial length of inner flank 502*d*. Accordingly, a circumferential path of axially endmost flank 502*c* of the endmost helical turn 504 is aligned non-parallel or transverse to i) the circumferential path of inner flank 502*d* within the transition region 700 and ii) the corresponding flanks 502*a*, 502*b* of the axially inner helical turns 505.

Figure 9:
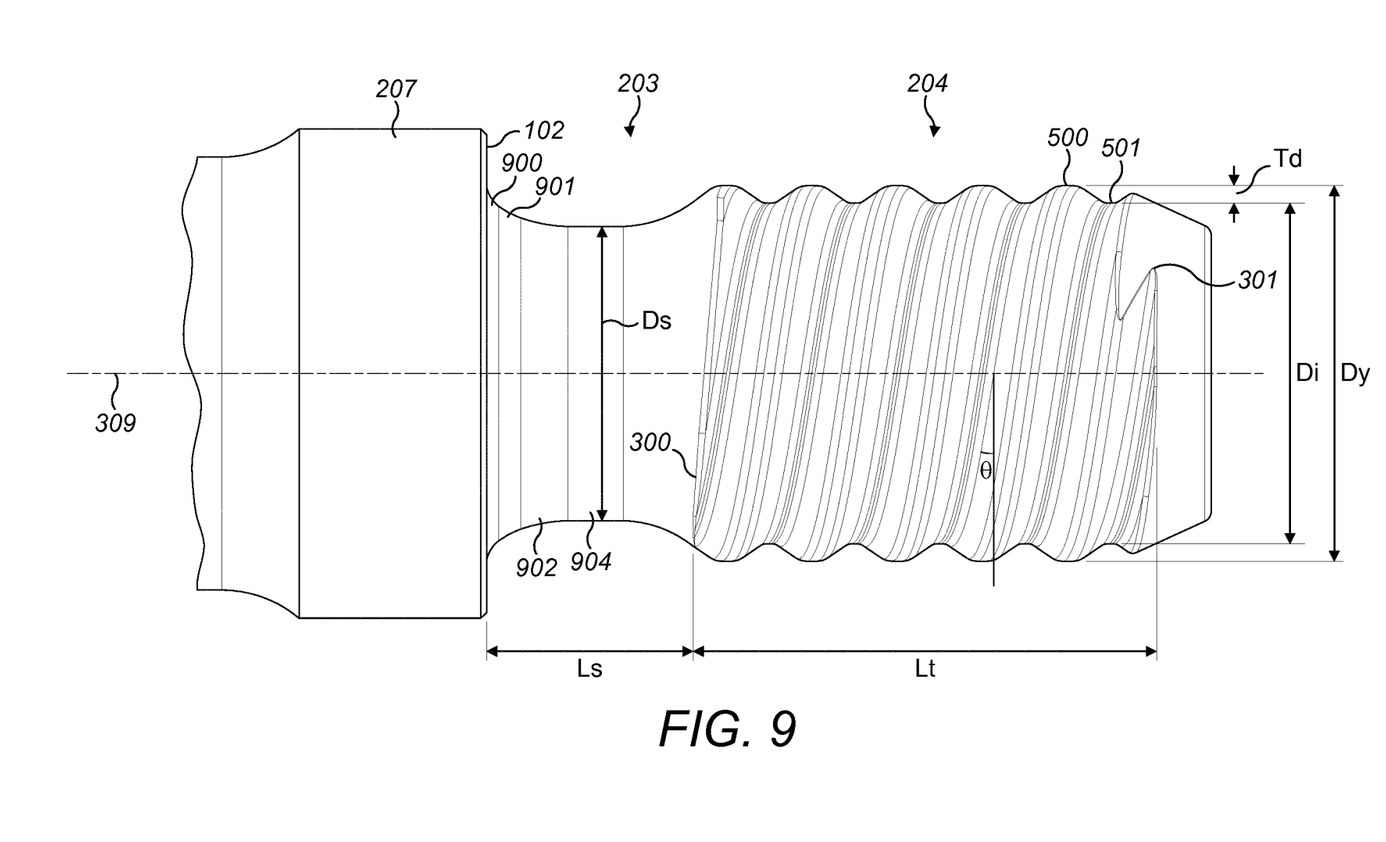
FIG. 9 is an external perspective view of the male spigot coupling end of the shank adaptor of FIG. 8 according to a further specific implementation of the present invention.

A further specific implementation of the male spigot 208 is detailed with reference to FIG. 9. FIG. 9 differs from the embodiment shown and described with reference to FIGS. 1 to 8 in that the non-threaded shank 203 comprises a continuously curved shape profile in the axial direction between side face 102 and the thread end 300. However, the configuration of the threaded section 204 described below according to the embodiment of FIG. 9 is applicable also to the embodiment of FIGS. 1 to 8.

Referring to FIG. 9 and to optimise the strength of the spigot 208 for resistance to bending forces encountered by the drill string during percussive drilling, the quotient Ls/Dy is in a range 0.4 to 1.0 and according to the specific implementation is 0.5 to 0.7, where Ls corresponds to an axial length of the non-threaded shank 203 defined between an axially inner end of the threaded section 300 and side surface 102; and Dy corresponds to the diametric distance between the radial positions of the crests 500 on diametrically opposite sides of the threaded section 204. Additionally and as detailed herein, Lt corresponds to an axial length of threaded section 204 and Di corresponds to the diametric distance between the radial positions of the roots 501 (between each helical ridge) on diametrically opposite sides of the threaded section 204. Moreover, Td corresponds to a depth of the thread between crests 500 and roots 501 in a plane perpendicular to longitudinal axis 309.

The strengthening of the spigot 208 may be expressed as the quotient Ls/L being in the range 0.25 to 0.5 and in particular 0.28 to 0.32. Additionally, enhancing the axial length Ls of the non-threaded shank 103 such that Lt is greater than Ls is advantageous to separate axially the threaded section 204 from annular side surface 102 that has been found through simulation investigations to minimise the stress at the helical turns and in particular the crests 500, roots 501 and flanks 502*a*, 502*b* for shoulder contact threaded couplings. Accordingly, the risk of failure of the coupling joint is minimised and the operational lifetime of the drill string components enhanced.

Threaded section 204 is formed as a generally cylindrical end section at spigot 208 such that the diameter Dy of the thread between crest 500 is generally uniform along the axial length of threaded section 204. Additionally, a diameter Di is also substantially uniform along the full axial length of the threaded section 204 between thread ends 300, 301. The subject invention is specifically adapted for percussion (or hammer) components forming part of a drilling apparatus and in particular a drill string by virtue of the configuration of the thread at the spigot 208. In particular, a pitch length of the thread may be in the range 5 to 50 mm depending upon the size (i.e., radius) of the elongate component. To optimise the thread for percussion drilling, a pitch angle θ may be in the range 5 to 10° for respective sizes of component. Such a configuration is to be contrasted with component threaded ends for rotary or exploration that may typically comprise API type threads having a much reduced pitch angle being of the order of 1°. In some implementations, an average thread diameter (crest-to-crest distance) may be in the range 15 to 120 mm being dependent upon the size (i.e., radius) of the elongate component.

Accordingly, the thread at the male spigot preferably comprises a quotient of pitch (crest to crest axial distance)/average thread diameter of 0.35 to 0.55 where the average thread diameter is the average of diameter of the male and female threaded ends.

The present male spigot is also configured to minimise stress concentrations at transition regions 900, 901, 902, 904 where such transition regions are positioned axially between threaded section 204 and shoulder 207 and in particular represent an axial portion of the non-threaded shank 203 that transitions from side surface 102 at shoulder 207. According to the specific implementation, non-threaded shank 203 comprises a transition region 900 to 904 at the junction with side surface 102 that increases in diameter from a minimum diameter Ds (of the non-threaded shank 203) according to a curved shaped profile. Additionally, the stress concentrations at the region around non-threaded shank 203 and threaded section 204 are further minimised by virtue of the relative dimensions of Ds, Di and Td. In particular, the stress concentrations at transition region 900 to 904 are minimised as far as possible where Ds is less than Dy and Ds is less than Di. In particular, a maximum diameter Ds may be equal to Di−Td and a minimum diameter Ds may be equal to Di−4Td. Preferably, Ds is approximately equal to Di−2Td.

The relative dimensions of Ds and Ls as described herein maximise the axial and radial distances over which the transition region 900 to 904 may extend. In particular, and according to the configuration of FIG. 9, the non-threaded shank 203 comprises a transition region having a first radius of curvature R1 at section 900 that is less than a second axially adjacent radius of curvature R2 at section 901 that is in turn less than an axially adjacent third radius of curvature R3 at section 902 that is in turn less than an axially adjacent fourth radius of curvature R4 at section 904. In particular, the radius R1 at section 900 is approximately equal to half the radius R2 at section 901; the radius R2 at section 901 is approximately half the radius R3 at section 902 and the radius R3 at section 902 is approximately one third of the radius R4 at section 904. As illustrated in FIG. 9, section 900 is positioned axially closest to side surface 102, section 901 is positioned second closest to side surface 102, section 902 is positioned third closest to side surface 102 and section 904 is positioned furthest from side surface 102. A minimised Ds and a maximised Ls accordingly enable a smooth transition between the non-threaded shank 203 and the shoulder 207. As such, spigot 208 is strengthened against bending induced stress and the stresses resultant from transmission of the percussive shock wave.

The invention claimed is:

1. A threaded coupling of a percussion drill string component for drilling, the coupling comprising:
    a body having a portion, a non-threaded shank section, an end most conical section, and a longitudinal axis; and
    a thread extending axially between the non-threaded shank section and the endmost conical section to form one half of a threaded joint, the thread being formed by at least one ridge extending circumferentially and axially along the body as helical turns having crests and roots separated axially by respective flanks, the thread having axially spaced apart first and second thread ends, the first thread end terminating at the endmost conical section and the second thread end terminating at the non-threaded shank section, a first endmost helical turn terminating at the first thread end, and a second endmost helical turn terminating at the second thread end, wherein the second endmost helical turn includes a transition region, the transition region having a transition start and a transition end, wherein, within the transition region, a depth of the thread being defined as a radial distance between a respective root and crest, the depth decreasing between the transition start and the transition end, the depth at the transition end being zero or substantially zero, wherein the second endmost helical turn includes a crest bordered at each side by asymmetric flanks, an endmost asymmetric flank being defined as the asymmetric flank axially closest to the non-threaded shank, and wherein the endmost flank decreases at a rate greater than a neighbouring flank.

2. The coupling as claimed in claim 1, wherein the portion of the body on which the thread is formed is generally cylindrical.

3. The coupling as claimed in claim 1, wherein an axial length of the neighbouring flank is approximately equal to the axial length of any one of the flanks of helical turns positioned axially between the first and second endmost helical turns.

4. The coupling as claimed in claim 1, wherein the thread is formed externally at the portion of the body to form a male coupling end.

5. The coupling as claimed in claim 1, wherein the thread is formed internally at the portion of the body to form a female coupling end.

6. The coupling as claimed in claim 1, wherein the the depth of the thread decreases towards the non-threaded shank along the circumferential path of the thread.

7. The coupling as claimed in claim 6, wherein the body includes an annular side surface projecting radially from one axial end of the non-threaded shank, the side surface being aligned transverse or generally perpendicular to the longitudinal axis.

8. The coupling as claimed in claim 1, wherein the respective flanks of the crests have a generally equal axial length over the axial length of the thread excluding the axially first and second endmost helical turns.

9. The coupling as claimed in claim 1, wherein the depth of the thread of the axially endmost helical turn decreases to zero in a range of 0.1 to 0.8 of a full helical turn.

10. The coupling as claimed in claim 1, wherein the range is 0.2 to 0.6.

11. The coupling as claimed in claim 1, wherein a circumferential path of the endmost flank is aligned transverse to a circumferential path of the neighbouring flank.

12. The coupling as claimed in claim 1, wherein a circumferential path of the endmost flank is angled or curved in the circumferential path of the thread towards the crest or root of the axially endmost helical turn relative to the circumferential path of the neighbouring flank such that an axial length of the endmost flank is less than the axial length of the neighbouring flank within an end transition region of the thread within which the depth of the thread decreases.

13. The coupling as claimed in claim 1, wherein a diameter of the thread at a radial position of the crest is equal to or greater than a diameter of the body axially to one side of the thread.

14. The coupling as claimed in claim 1, wherein a diameter of the thread at a radial position of the crest is equal to or less than a diameter of the body axially to one side of the thread.

15. A percussion drill string component comprising the threaded coupling as claimed in claim 1, wherein the component is any one of the following: a drill rod; a drill tube; a shank adaptor; and a drill bit.

\* \* \* \* \*